US011339950B2

(12) United States Patent
Wu

(10) Patent No.: US 11,339,950 B2
(45) Date of Patent: May 24, 2022

(54) BACK LIGHT MODULE

(71) Applicant: AU OPTRONICS CORPORATION, Hsin-Chu (TW)

(72) Inventor: Tsai-Fen Wu, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 17/186,427

(22) Filed: Feb. 26, 2021

(65) Prior Publication Data
US 2021/0270447 A1 Sep. 2, 2021

(30) Foreign Application Priority Data

Feb. 27, 2020 (TW) ................................ 109106381

(51) Int. Cl.
F21V 15/01 (2006.01)
F21V 33/00 (2006.01)
F21V 8/00 (2006.01)

(52) U.S. Cl.
CPC .......... F21V 15/01 (2013.01); F21V 33/0052 (2013.01); G02B 6/0086 (2013.01)

(58) Field of Classification Search
CPC ... F21V 15/01; F21V 33/0052; G02B 6/0086; G09F 9/00; H05K 5/0217
See application file for complete search history.

(56) References Cited

U.S. PATENT DOCUMENTS 8,582,050 B2 * 11/2013 Li ..................... G02F 1/133615
349/58
8,830,420 B2 * 9/2014 Kuo ..................... G02B 6/0081
349/58
(Continued)

FOREIGN PATENT DOCUMENTS

CN 101876758 A 11/2010
CN 102287680 A 12/2011
(Continued)

OTHER PUBLICATIONS

CNIPA has issued the Office Action for the corresponding China application dated Dec. 2, 2021.

Primary Examiner — Tsion Tumebo
(74) Attorney, Agent, or Firm — WPAT, PC

(57) ABSTRACT

A backlight module comprising an optical component, a frame and an elastic member is presented. The frame has a first sidewall and a second sidewall. An end of the first sidewall is connected to an end of the second sidewall to form a corner portion. The first sidewall and the second sidewall are located at different sides of the optical component. The first sidewall and the second sidewall include a first angle therebetween. The elastic member is configured to be disposed on the frame. The elastic member includes a flange portion, a first extension portion and a second extension portion. The flange portion is configured to be disposed on the corner portion. The first extension portion extends along a first direction away from the flange portion and has a first surface. The second extension portion extends along a second direction away from the flange portion and has a second surface. A second angle is included between the first extension portion and the second extension portion. Wherein before the elastic member is disposed on the frame, the second angle is greater than the first angle; when the elastic member is disposed on the frame, the flange portion engages with the corner portion, the first surface is against an inner surface of the first sidewall, and the second surface is against an inner surface of the second sidewall.

12 Claims, 8 Drawing Sheets

(56) References Cited

U.S. PATENT DOCUMENTS

| | | | |
|---|---|---|---|
| 9,046,635 B2 | 6/2015 | Bae et al. | |
| 9,651,808 B2* | 5/2017 | Lin | A47B 81/06 |
| 9,784,908 B2* | 10/2017 | Wu | G02B 6/0088 |
| 9,891,374 B2* | 2/2018 | Lee | G02B 6/0088 |
| 10,036,848 B2* | 7/2018 | Ikuta | G02B 6/0073 |
| 10,670,799 B2* | 6/2020 | Lee | G02B 6/0088 |
| 2011/0292315 A1* | 12/2011 | Bae | G02F 1/133308 |
| | | | 349/58 |
| 2013/0033657 A1* | 2/2013 | Li | G02F 1/133615 |
| | | | 349/60 |
| 2013/0064600 A1 | 3/2013 | Tseng et al. | |
| 2013/0077343 A1* | 3/2013 | Kim | G02F 1/133615 |
| | | | 362/602 |
| 2014/0112021 A1* | 4/2014 | Wang | G02B 6/0088 |
| | | | 362/633 |

FOREIGN PATENT DOCUMENTS

| | | |
|---|---|---|
| CN | 102409936 A | 4/2012 |
| CN | 202253135 U | 5/2012 |
| CN | 102298878 B | 4/2013 |

* cited by examiner

BACK LIGHT MODULE

BACKGROUND OF THE INVENTION

1. Field of the Invention

The present invention relates to a backlight module. More specifically, the present invention relates to a backlight module with an elastic member at a corner portion of the backlight module.

2. Description of the Prior Art

Backlight module is a key component of a display device. When producing a thin or narrow frame display device, the space inside the back board or the case of the display device is limited, resulting in the reduced size or thickness of the components inside the display device. For example, the buffer material or packaging material of the display device has to be simplified or have its thickness reduced.

However, when the thickness of the internal components of the backlight module is reduced or the structure of the backlight module is simplified, it will also increase the difficulty of installation. For example, there are often light guide plates or optical films arranged in/on a conventional backlight module. Hence, a buffer material is often arranged between the light guide plate and the frame of the backlight module to protect the light guide plate and/or the optical films or to provide positioning. If the thickness of the buffer material is reduced, the buffer material will be soft. Due to the thinness and softness of the buffer material, it is not easy to stick it or position it on the inner wall of the frame during installation, or it is easy to have the buffer material interfere with the light guide plate, which leads to improper installation. In addition, if the buffer material arranged in the corner portion of the frame is not properly installed, it may lead to light leakage from the joint site on the side wall of the frame. Accordingly, it not only increases the difficulty of installation, but also increases the time cost to assemble the display device and leads to low production output and high cost.

SUMMARY OF THE INVENTION

One of the purposes of the present invention is to provide a backlight module to reduce the difficulty of installing the elastic member.

One of the purposes of the present invention is to provide a backlight module to facilitate the reproduction process of the backlight module.

The present invention provides a backlight module comprising an optical component, a frame and an elastic member. The frame has a first sidewall and a second sidewall. An end of the first sidewall is connected to an end of the second sidewall to form a corner portion. The first sidewall and the second sidewall are located at different sides of the optical component. The first sidewall and the second sidewall include a first angle therebetween. The elastic member is configured to be disposed on the frame. The elastic member includes a flange portion, a first extension portion and a second extension portion. The flange portion is configured to be disposed on the corner portion. The first extension portion extends along a first direction away from the flange portion and has a first surface. The second extension portion extends along a second direction away from the flange portion and has a second surface. A second angle is included between the first extension portion and the second extension portion. Wherein before the elastic member is disposed on the frame, the second angle is greater than the first angle; when the elastic member is disposed on the frame, the flange portion engages with the corner portion, the first surface is against an inner surface of the first sidewall, and the second surface is against an inner surface of the second sidewall.

The present invention provides a backlight module comprising an optical component, a frame and an elastic. The frame has a first sidewall and a second sidewall. An end of the first sidewall is connected to an end of the second sidewall to form a corner portion. The first sidewall and the second sidewall are located at different sides of the optical component. The elastic member is disposed on the frame. The elastic member includes a flange portion, a first extension portion and a second extension portion. The flange portion engages with the corner portion. The first extension portion extends along a first direction away from the flange portion and has a first surface against an inner surface of the first sidewall. The second extension portion extends along a second direction away from the flange portion and has a second surface against an inner surface of the second sidewall. Wherein a portion of the elastic member has an internal stress greater than other portions of the elastic member.

Accordingly, the elastic member can be fast and stably installed on the frame of the backlight module by the force of the flange portion of the elastic member engaging with the corner portion of the frame and the force of compressing the first extension portion and the second extension portion to reduce the time cost and increase the production output.

DETAILED DESCRIPTION OF THE PREFERRED EMBODIMENT

The connecting elements according to the present invention will be described in detail below through embodiments and with reference to the accompanying drawings. A person having ordinary skill in the art may understand the advantages and effects of the present disclosure through the contents disclosed in the present specification.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

The terms "comprise", "include" or "have" used in the present specification are open-ended terms and mean to "include, but not limit to."

Unless otherwise particularly indicated, the terms, as used herein, generally have the meanings that would be commonly understood by those of ordinary skill in the art. Some terms used to describe the present disclosure are discussed below or elsewhere in this specification to provide additional guidance to those skilled in the art in connection with the description of the present disclosure.

Figure 1:
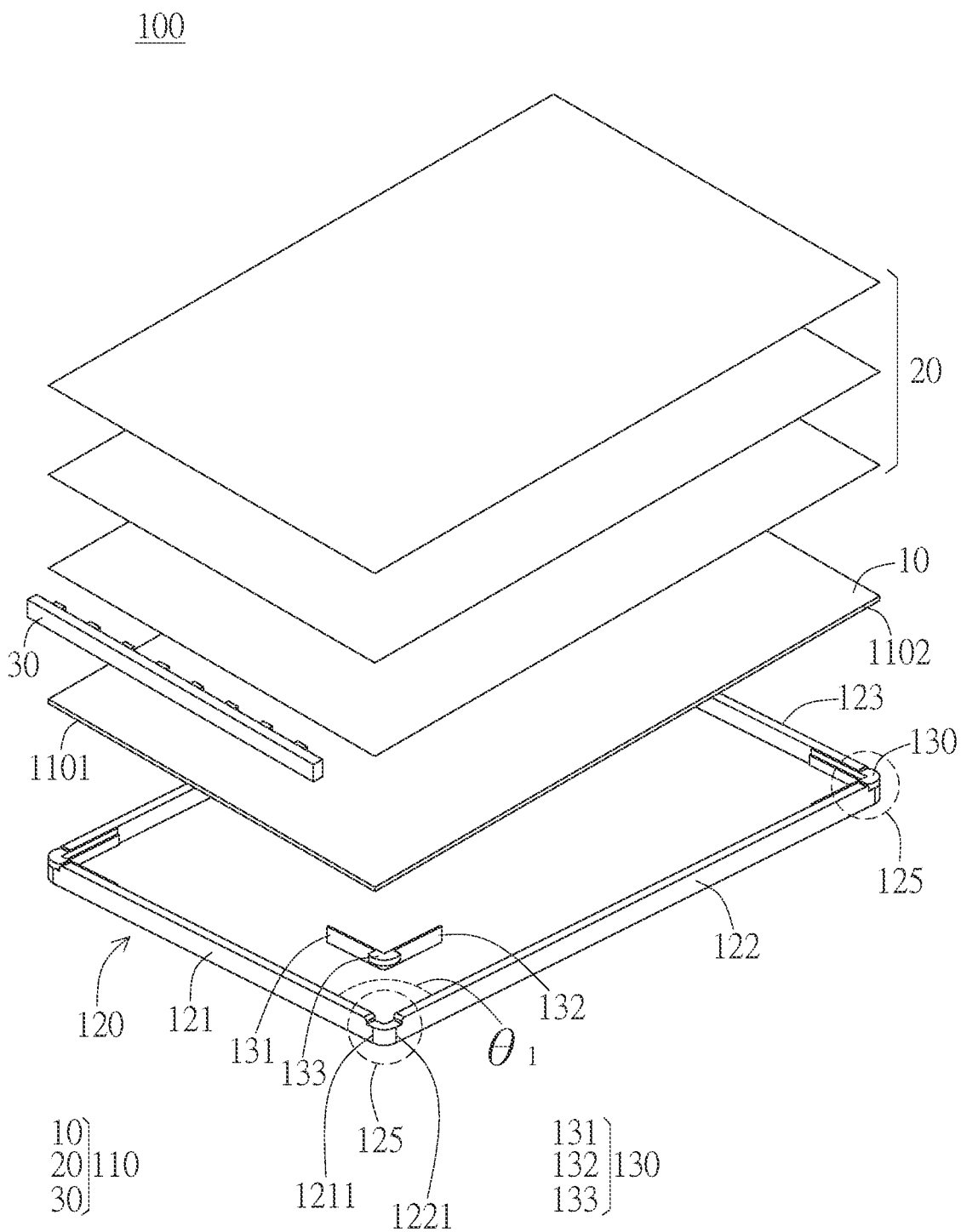
FIG. 1 is an explosion view of the backlight module according to an embodiment of the present invention.

Refer to FIG. 1. FIG. 1 illustrates the backlight module 100 comprising the optical component 110, the frame 120 and the elastic member 130. The optical component 110 can be the light guide plate 10, such as a diffusing plate or a light-enhance plate, and/or the optical films 20. In addition, the backlight module 100 can further comprise light source 30 or other components. The material of the frame 120 can be but not limited to metal or plastic. The frame 120 has the first sidewall 121 and the second sidewall 122. The end 1211 of the first sidewall 121 is connected to the end 1221 of the second sidewall 122 to form the corner portion 125. It should be noted that each two adjacent sidewalls of the frame 120 can be connected to form a corner portion. For example, a corner portion can be formed by connecting the sidewall 122 and the sidewall 123 to enable the disposing of an elastic member on the frame 120.

As shown in FIG. 1, the first sidewall 121 and the second sidewall 122 are located at different sides of the optical component 110 and preferably perpendicular to each other. For example, the first sidewall 121 faces the first side 1101 of the optical component 110 and the second sidewall 122 faces the second side 1102 of the optical component 110. On the other hand, the corner portion 125 is defined as an area extended from the connection site of the first sidewall 121 and the second sidewall 122 toward first sidewall 121 and the second sidewall 122, and the area of the region can be adjusted according to production needs or limits. For example, the size of the corner portion 125 of the frame 120 can be adjusted according to the limitation of production tolerance or the size or shape of the elastic member 130, but the reason for adjusting the size of the corner portion 125 is not limited to the examples mentioned above. The sidewall 121 and the second sidewall 122 include the first angle $\theta 1$. It should be noted that the first angle $\theta 1$ is not limited to the embodiment shown in FIG. 1. More specifically, although the first angle $\theta 1$ is a right angle in the embodiment, the first angle $\theta 1$ can be changed according to the shape of the frame 120. For example, if the shape of the frame 120 is a polygon, the first angle $\theta 1$ can be an obtuse or an acute angle.

Figure 2A:
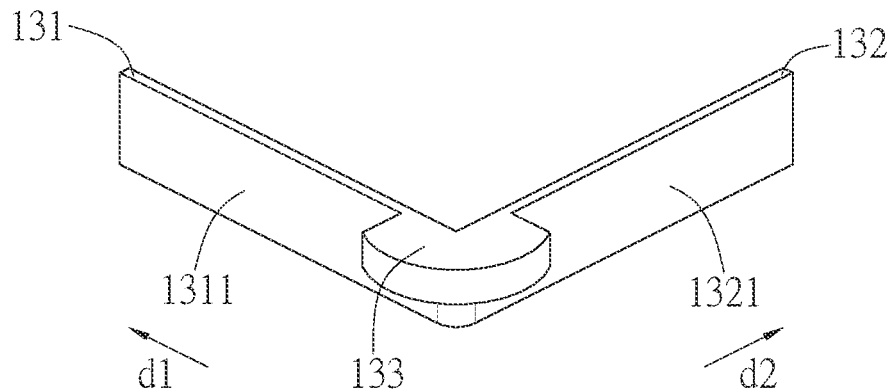
FIG. 2A and FIG. 2B are schematic views of different perspectives of the elastic member according to an embodiment of the present invention.
Figure 2B:
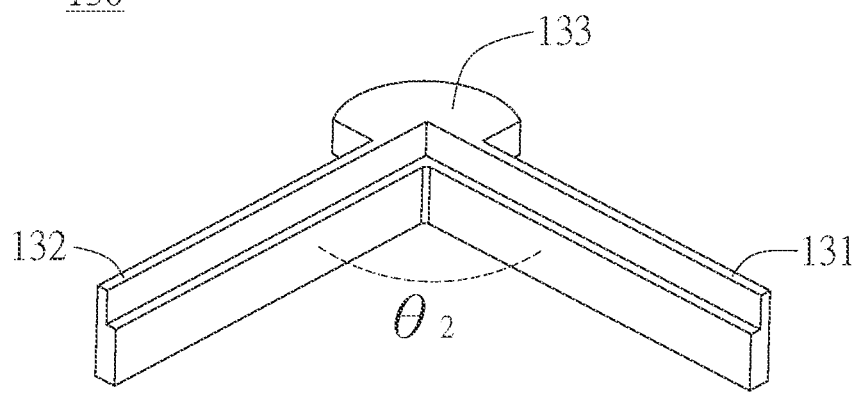

Refer to FIG. 2A and FIG. 2B. The elastic member 130 can be made of elastic materials such as rubber or silicone, preferably having a Shore hardness of 40 to 80 to have the proper effect of buffering and resilience. The elastic member 130 can be disposed on the frame 120. The elastic member 130 includes the flange portion 133, the first extension portion 131 and the second extension portion 132. The flange portion 133 can engage with the corner portion 125. For example, a slot can be formed at the corner portion 125, and the size of the flange portion 133 can be slightly larger than the size of the slot of the corner portion 125. Since the flange portion 133 is elastic and compressible, the flange portion 133 can be inserted into or stuck into the slot of the corner portion 125 by tight fitting. In another example, the flange portion 133 can engage with the corner portion 125 by structure matching, such as forming a groove or seam at the corner portion 125 (not shown in FIGS. 2A-2B) to combine the part of the first sidewall 121 and/or the second sidewall 122 located in the region of the corner portion 125. As shown in FIGS. 1-2B, the flange portion 133 spans over where the first extension portion 131 and the second extension portion 132 are connected. The first extension portion 131 is extended along the first direction d1 away from the flange portion 133 and has the first surface 1311. The second extension portion 132 is extended along the second direction d2 away from the flange portion 133 and has the second surface 1321. The second angle $\theta 2$ is included between the first extension portion 131 and the second extension portion 132. For example, when producing the elastic member 130, the first extension portion 131, the second extension portion 132 and the flange portion 133 can be formed by transfer molding, injection molding or other ways to form an unibody. The first extension portion 131 and the second extension portion 132 is preferably a rectangular strip. The first extension portion 131 and the second extension portion 132 can also be cylindrical or triangular columnar.

Figure 3A:
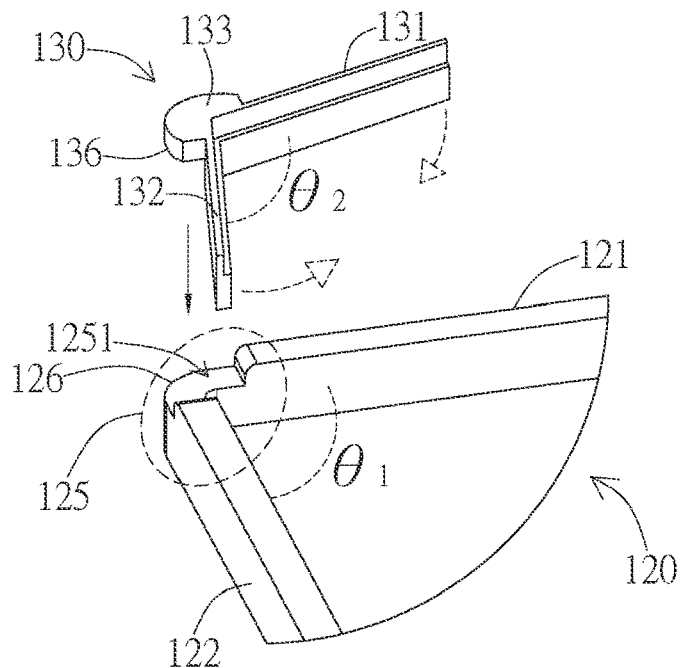
FIGS. 3A to 3C are schematic views of the process of installing the elastic member according to an embodiment of the present invention.
Figure 3B:
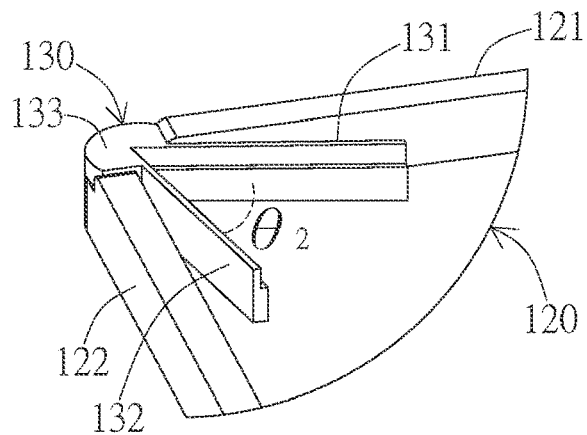
Figure 3C:
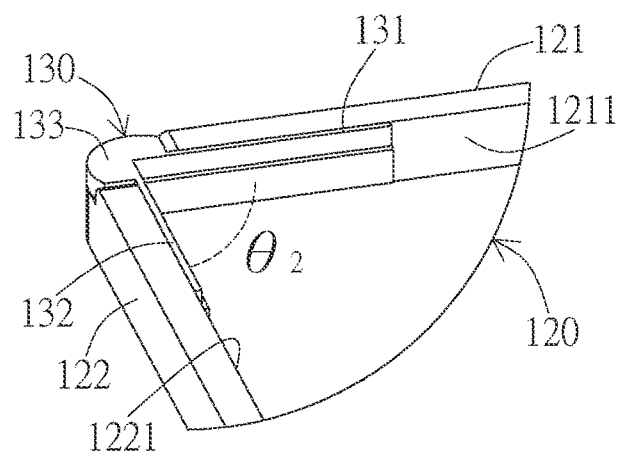

FIGS. 3A to 3C illustrate an example for disposing the elastic member on the frame. Refer to FIG. 3A. Before the elastic member 130 is disposed on the frame 120, the second angle $\theta 2$ between the first extension portion 131 and the second extension portion 132 of the elastic member 130 is larger than the first angle $\theta 1$ between the first sidewall 121 and the second sidewall 122. The difference between the first angle $\theta 1$ and the second angle $\theta 2$ is preferably larger than 0 degree and equal to or less than 60 degrees. The angle difference between the first angle $\theta 1$ and the second angle $\theta 2$ should be determined by the material characteristics of the elastic member 130. For example, if the material of the elastic member 130 is tough and has good elasticity, the angle difference between the first angle $\theta 1$ and the second angle $\theta 2$ can be larger. As shown in FIG. 3B, when disposing the elastic member 130, compress the first extension portion 131 and the second extension portion 132 first. For example, compress the free ends of the first extension portion 131 and the second extension portion 132 to make the first extension portion 131 and the second extension portion 132 close to each other by the flexibility of the elastic member 130. In other words, when disposing the elastic member 130 on the on the frame 120, the second angle $\theta 2$ is smaller than the first angle $\theta 1$ to facilitate installation. The way to compress the first extension portion 131 and the second extension portion 132 can be but not limited to implementing by fixtures or manpower. After compressing the first extension portion 131 and the second extension portion 132, dispose the flange portion 133 toward the corner portion 125. As shown in FIG. 3B, in an embodiment, the corner portion 125 is lower in height than other portions of the first sidewall 121 and the second sidewall 122 to form the notch 1251, and the flange portion 133 is adapted to engage with the notch 1251. When engaged with the notch 1251, the outer edge 136 of the flange portion 133 is preferably aligned with the outer edge 126 of the sidewall 120. In addition, it is also possible to reduce the gap between the elastic member 130 and the frame 120 after the flange portion 133 is engaged with the notch 1251, and the connection stability can be increased by using the compressible characteristics of the flange portion 133 and the tight fitting configuration during installation.

Refer to FIG. 3C. After the flange portion 133 is engaged with the notch 1251 and releases the force to compress the first extension portion 131 and the second extension portion 132, the first extension portion 131 and the second extension portion 132 will spring back by the elastic properties of the elastic member 130. The first surface 1311 of the first extension portion 131 will be against the inner surface 1211 of the first sidewall 121. The second surface 1321 of the second extension portion 132 will be against the inner surface 1221 of the second sidewall 122. More specifically, when the elastic member 130 is disposed on the frame 120, the angle between the first extension portion 131 and the second extension portion 132 is limited by the first sidewall 121 and the second sidewall 122 and is unable to fully bounce back to the second angle θ2, and the elastic potential energy is accumulated. Therefore, the first extension portion 131 and the second extension portion 132 will apply a force to the first sidewall 121 and the second sidewall 122 to increase the friction between the first extension portion 131 and the first sidewall 121 and/or the second extension portion 132 and the second sidewall 122. In other words, the elastic member 130 is disposed on the frame 120 not only by engaging the flange portion 133 with the notch 1251, but also by the force applied from the first extension portion 131 and the second extension portion 132 to firmly fix the elastic member 130 on the frame. In an embodiment, the elastic member 130 or the sidewalls 121, 122 can further increase the friction between the first extension portion 131 and the first sidewall 121 and/or the second extension portion 132 and the second sidewall 122 by physical or chemical means, such as increasing the roughness of the contact surface or coating polyurethane or silicone films on the contact surface. It should be noted that the contact surface can be located on at least one of the elastic member 130 and sidewalls 121, 122.

After the elastic member 130 is disposed on the frame 120, an internal stress, such as compressive stress or tensile stress, is formed inside the elastic member 130 by compressing the first extension portion 131 and the second extension portion 132 to cause a portion of the elastic member 130 to have an internal stress larger than other portions of the elastic member 130. For example, the connection site between the side of the first extension portion 131 opposite to the first sidewall 121 and the flange portion 133 will produce compressive stress from being compressed by the first sidewall 121. Or, tensile stress will be produced at the connection site between the side of the first extension portion 131 facing the first sidewall 121 and the flange portion 133 due to the compression of the elastic member 130. In an embodiment, the flange portion 133 located at the connection site between an end of the first extension portion 131 and an end of the second extension portion 132 has an internal stress larger than other portions of the elastic member 130, such as the first extension portion 131 and the second extension portion 132. Accordingly, the flange portion 133 can be a source of support for the compression of the first sidewall 121 and/or second sidewall 122 by the first extension portion 131 and/or second extension portion 132.

Figure 4A:
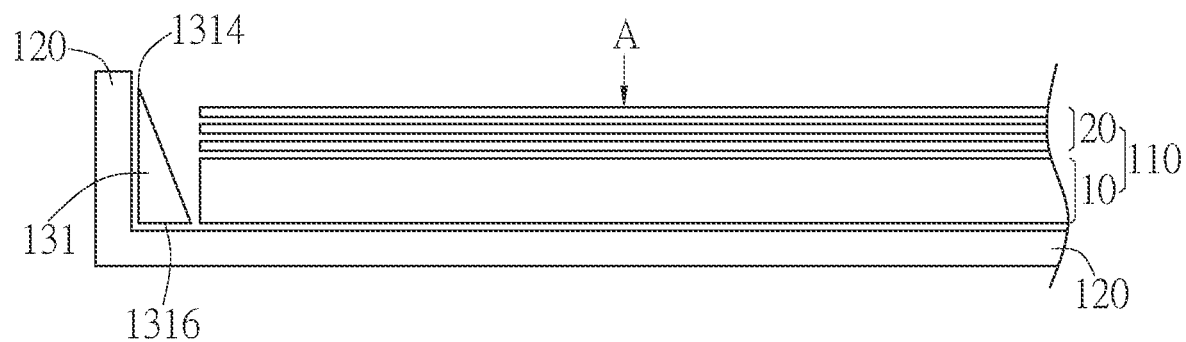
FIGS. 4A to 4D are cross-section views of the extension portion of the elastic member according to an embodiment of the present invention.
Figure 4B:
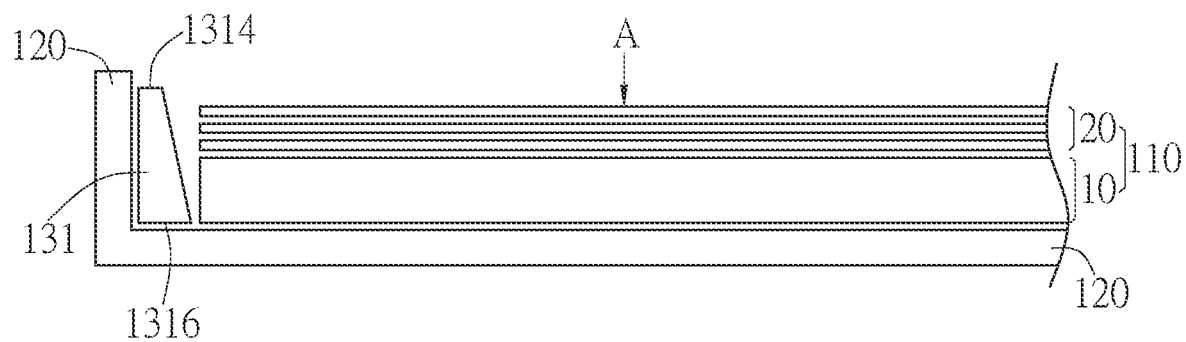
Figure 4C:
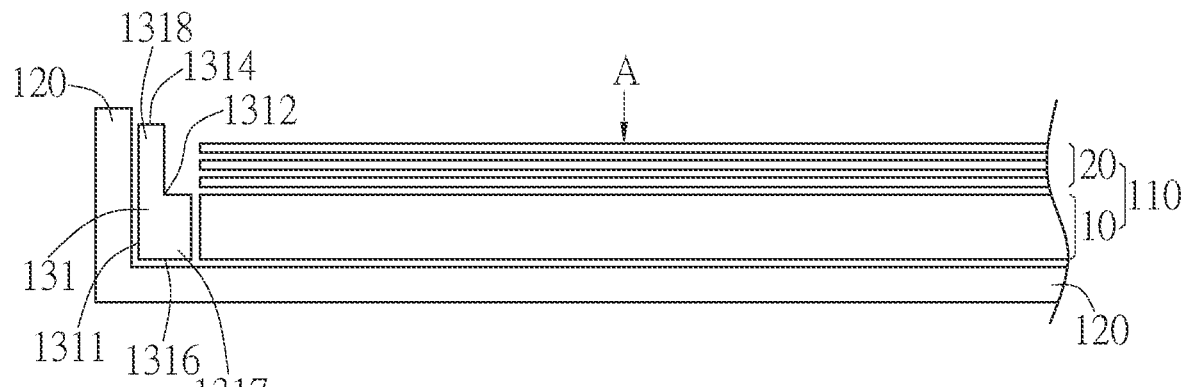
Figure 4D:
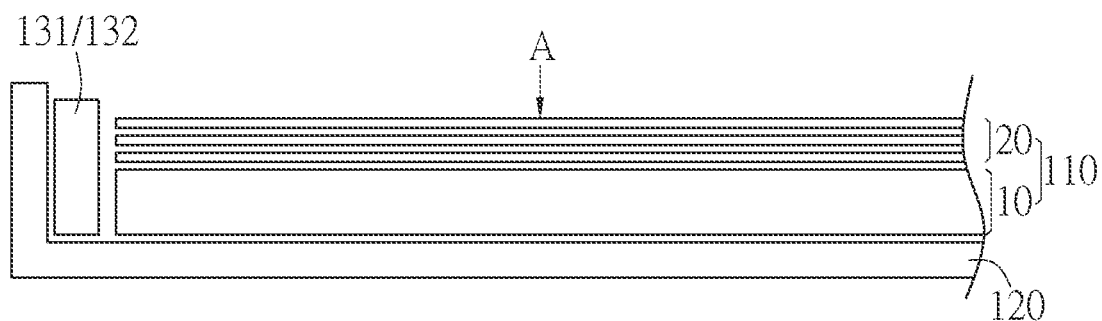

FIG. 4A to FIG. 4D are cross-section views of the backlight module. Refer to the backlight module 100 shown in FIGS. 4A and 4B. The first extension portion 131 further has the top end 1314 and the bottom end 1316. The top end 1314 is closer to the light-emitting surface A of the optical component 110 than the bottom end 1316. The thickness of the first extension portion 131 near the bottom end 1316 is greater than the thickness of the first extension portion 131 near the top end 1314. For example, the cross section of the first extension portion 131 is triangular (shown in FIG. 4A) or trapezoidal (shown in FIG. 4b). In another embodiment, as shown in FIG. 4C, the first extension portion 131 further has the third surface 1312 opposite to the first surface 1311, and the third surface 1312 has a stepped configuration. The first extension portion 131 has the first step 1317 near the bottom end 1316 and the second step 1318 near the top end 1314. The height of the first step 1317 is substantially equal or similar to the height of the light guide plate 10. In other words, the top end of the first step 1317 is aligned with the light emitting surface of the light guide plate 10. By this setting, the elastic member 130 can be retracted at the second step 1318 to create a larger space to accommodate other component such as optical films 20. It should be noted that the second extension portion 132 can also have a stepped configuration. But the first extension portion 131 and the second extension portion 132 can use a difference configuration, depending on the type or structure of the optical component 110 integrated to the backlight module 100. In an embodiment, the first extension portion 131 and the second extension portion 132 can be arranged without a stepped configuration, as shown in FIG. 4D.

Figure 5A:
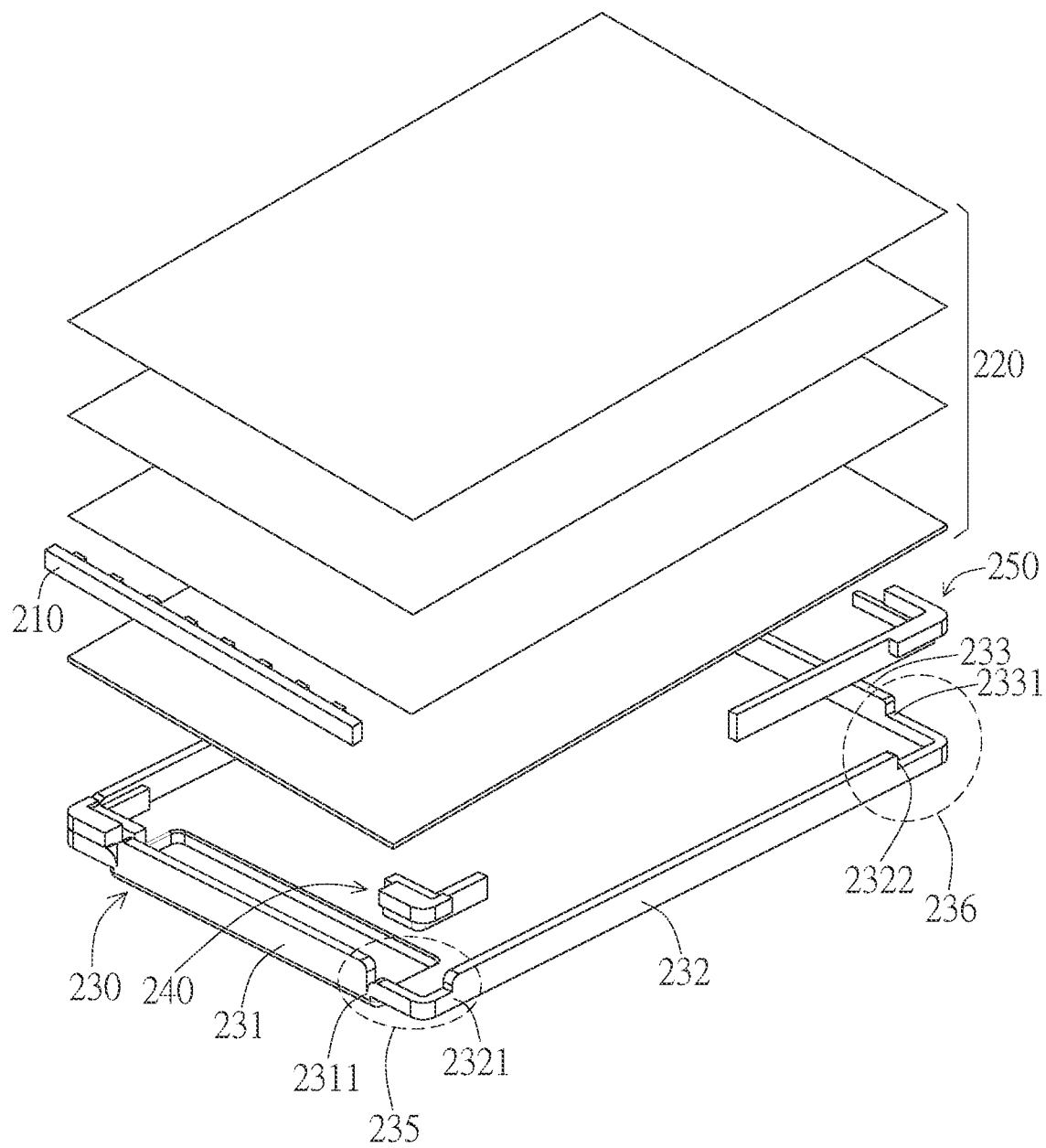
FIG. 5A is an explosion view of the backlight module according to an embodiment of the present invention.
Figure 5B:
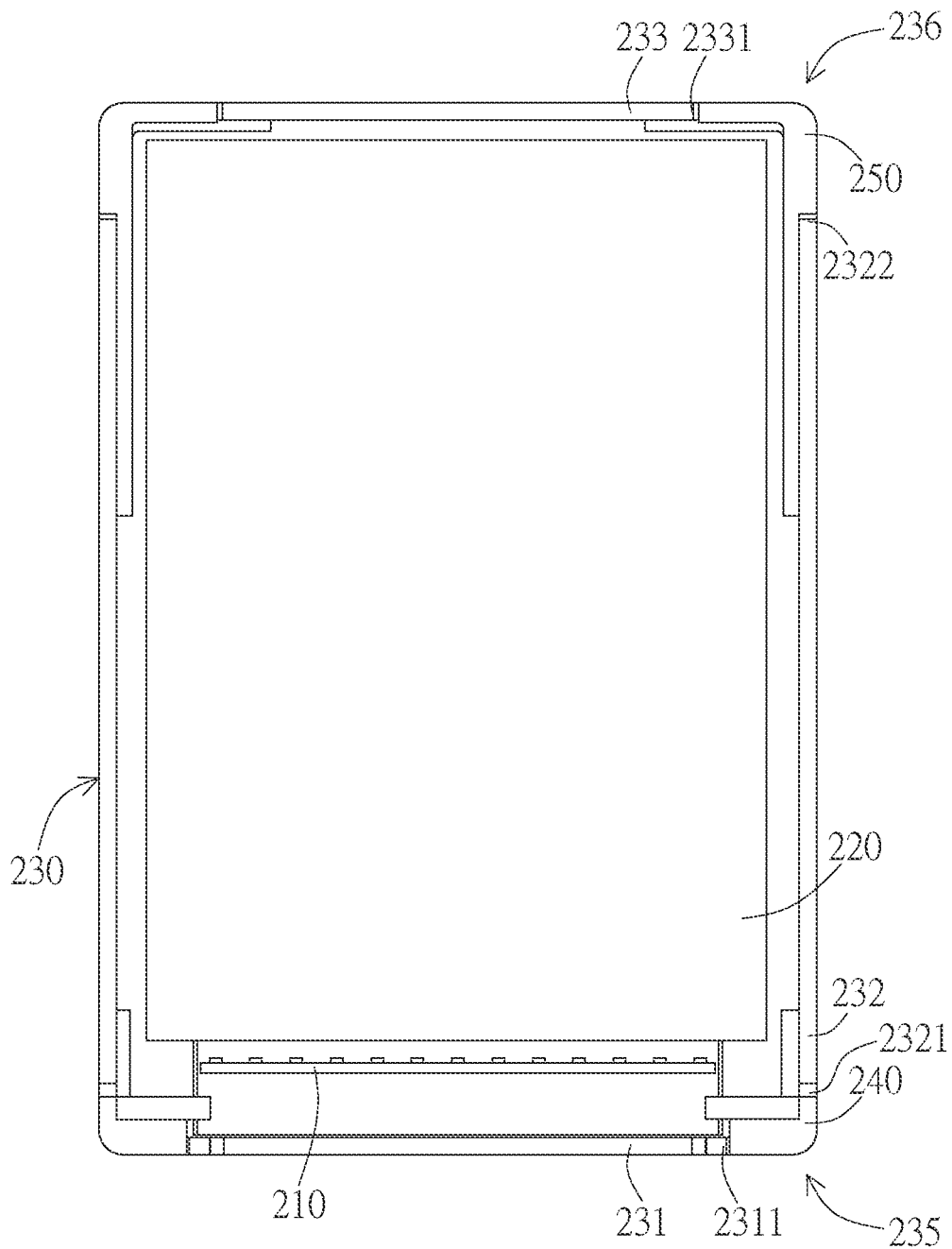
FIG. 5B is a schematic view according to the embodiment of FIG. 5A.
Figure 6A:
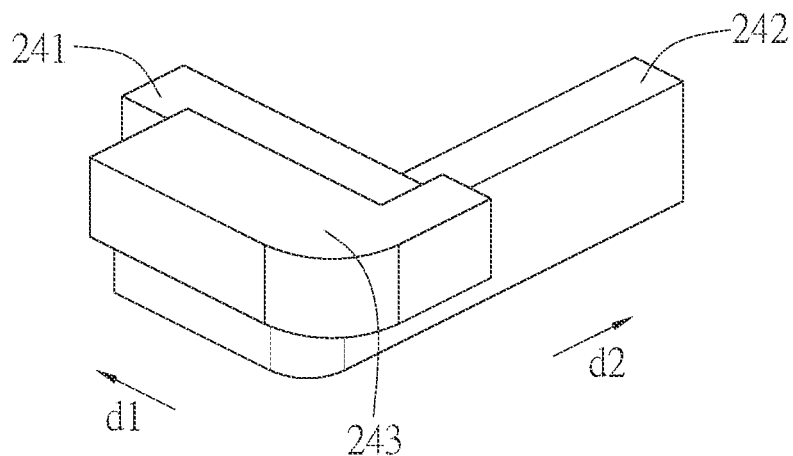
FIG. 6A and FIG. 6B are schematic views of different perspectives of the elastic member according to an embodiment of the present invention.
Figure 6B:
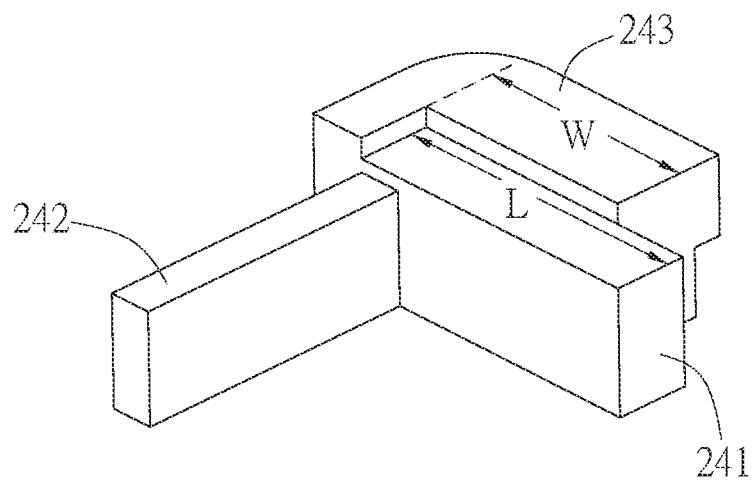
Figure 7A:
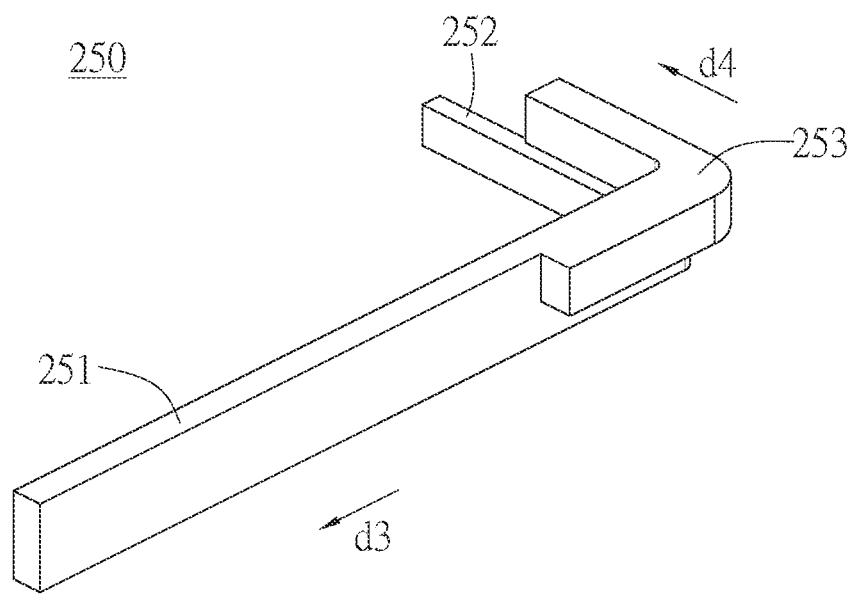
FIG. 7A and FIG. 7B are schematic views of different perspectives of the elastic member according to an embodiment of the present invention.
Figure 7B:
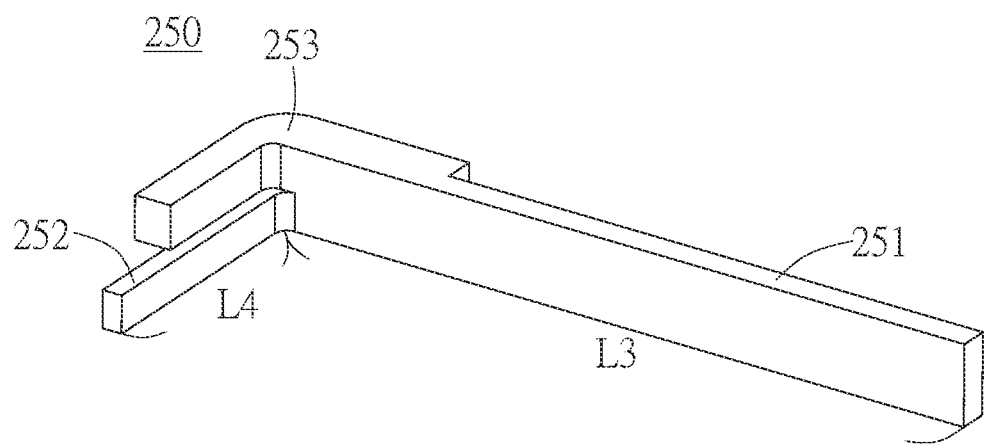

In an embodiment, the shape of the elastic member can be changed according to the arrangement site of the elastic member and the optical component near the elastic member. Refer to FIG. 5A and FIG. 5B. The backlight module 200 comprises the light source 210, the optical component 220, the frame 230, the first elastic member 240 and the second elastic member 250. The frame 230 has the first sidewall 231, the second sidewall 232 and the third sidewall 233. The end 2311 of the first sidewall 231 is connected with the end 2321 of the second sidewall 232 to form the first corner portion 235. The end 2322 of the second sidewall 232 is connected with the end 2331 of the third sidewall 233 to form the second corner portion 236. Wherein the first sidewall 231 and the second sidewall 232 are located at different side of the light source 210. The second sidewall 232 and the third sidewall 233 are located at different side of the optical component 220. The first elastic member 240 and the second elastic member 250 are respectively disposed on the frame 230. Refer to FIG. 6A and FIG. 6B. The first elastic member 240 includes the first flange portion 243, the first extension portion 241 and the second extension portion 242. The first flange portion 241 is engaged with the first corner portion 235. The first extension portion 241 is extended along the first direction d1 away from the first flange portion 243. The second extension portion 242 is extended along the second direction d2 away from the first flange portion 243. Refer to FIG. 7A and FIG. 7B. The second elastic member 250 includes the second flange portion 253, the third extension portion 251 and the fourth extension portion 252. The second flange portion 253 is engaged with the second corner portion 236. The third extension portion 251 is extended along the third direction d3 away from the second flange portion 253. The fourth extension portion 252 is extended along the fourth direction d4 away from the second flange portion 253. It should be noted that the first direction d1 and the second direction d2 are merely for explaining that the first extension portion 241 and the second extension portion 242 are extended along different directions away from the first flange portion 243, and the third direction d3 and the fourth direction d4 are merely for explaining that the third extension portion 251 and the fourth extension portion 252 are extended along different directions away from the second flange portion 253 instead for limiting the extending direction of the extension portions 241, 242, 251, and 252. After the first elastic member 240 and the second elastic member 250 are disposed on the frame, the first flange portion 243 has an internal stress larger than other portions of the first elastic member 240. The second flange portion 253 has an inner stress larger than other portions of the second elastic member 250. More specifically, the way to dispose the first elastic member 240 and the second elastic member 250 can be similar to the embodiment mentioned above—by compressing the extension portions 241, 242, 251, and 252 and engaging them with corner portions 235, 236, then releasing the extension portions 241, 242, 251, and 252 to make the extension portions 241, 242, 251, and 252 lie against the corresponding inner surfaces of the sidewall 231, 232, and 233.

Since the first elastic member 240 and the second elastic member 250 are located at different sites corresponding to the frame 230 or the optical component 220, the structure or the shape of the first elastic member 240 is different from the second elastic member, and the length of the extension portions 241, 242, 251, and 252 has different configurations. For example, refer to FIG. 6A and FIG. 6B. The first flange portion 243 is extended along the first direction d1, wherein the length W of the extended first flange portion 243 is shorter than the length L of the first extension portion 241. It should be noted that the extended first flange portion 243 is adapted to dispose on the first corner portion 235. In an embodiment, referring to FIG. 7A and FIG. 7B, the length L3 of the third extension portion 251 is longer than the length L4 of the fourth extension portion 252. With different configurations of the structure of the flange portions 243 and 253 and the length of the extension portions 241, 242, 251, and 252, the optical components 210 and 220 arranged in the frame 230 will be well protected and the configurations will provide a proper appearance. In an embodiment, the color of the elastic member can be adjusted according to the color of the frame or the appearance of the backlight module or product. For example, the elastic member can be dark, white, gray or other suitable colors. However, the reason to choose the color of the elastic member should not be limited by the embodiment mentioned above.

In an embodiment, the elastic member can be disposed on the frame with an adhesive (not shown in the figures). The adhesive can be disposed at any portion of the elastic member against the frame. Preferably, the adhesive can be disposed on the first extension portion which is longer than the second extension portion. More specifically, the adhesive is disposed on the first surface of the first extension portion. When the first surface is against the first sidewall of the frame, the adhesive is disposed between the first surface and the inner surface of the first sidewall and supports the elastic member to be fixed on the frame. In an embodiment, when the length of the first extension portion is equal to the length of the second extension portion, an adhesive is disposed between the first surface and the inner surface of the first sidewall, or between the second surface and the inner surface of the second sidewall. Accordingly, since the adhesive is only disposed on one of the extension portions of the elastic member, the cost to dispose adhesive on the elastic member or dispose the elastic member on the frame can be reduced.

Although the present invention discloses the aforementioned embodiments, it is not intended to limit the invention. Any person who is skilled in the art in connection with the present invention can make any change or modification without departing from the spirit and scope of the present invention. Therefore, the scope of protection of the present invention should be determined by the claims in the invention.

What is claimed is:

1. A backlight module, comprising:
an optical component;
a frame having a first sidewall and a second sidewall, an end of the first sidewall connected to an end of the second sidewall to form a corner portion, the first sidewall and the second sidewall located at different sides of the optical component, the first sidewall and the second sidewall including a first angle therebetween; and
an elastic member configured to be disposed on the frame, the elastic member including:
a flange portion configured to be disposed on the corner portion;
a first extension portion extending along a first direction away from the flange portion and having a first surface; and
a second extension portion extending along a second direction away from the flange portion and having a second surface, a second angle included between the first extension portion and the second extension portion;
wherein before the elastic member is disposed on the frame, the second angle is larger than the first angle; when the elastic member is disposed on the frame, the flange portion engages with the corner portion, the first surface is against an inner surface of the first sidewall, and the second surface is against an inner surface of the second sidewall.

2. A backlight module, comprising:
an optical component;
a frame having a first sidewall and a second sidewall, an end of the first sidewall connected to an end of the second sidewall to form a corner portion, the first sidewall and the second sidewall located at different sides of the optical component; and
an elastic member disposed on the frame, the elastic member including:
a flange portion engaging with the corner portion;
a first extension portion extending along a first direction away from the flange portion and having a first surface against an inner surface of the first sidewall; and
a second extension portion extending along a second direction away from the flange portion and having a second surface against an inner surface of the second sidewall;
wherein the flange portion has an internal stress larger than other portions of the elastic member.

3. The backlight module according to claim 1, wherein the flange portion is spanned over where the first extension portion and the second extension portion are connected, and the flange portion has an internal stress larger than other portions of the elastic member.

4. The backlight module according to claim 1, before the elastic member is disposed on the frame, a difference between the second angle and the first angle is larger than 0 degree and equal to or less than 60 degrees.

5. The backlight module according to claim 1, wherein a material of the elastic member has a Shore hardness of 40 to 80.

6. The backlight module according to claim 1, wherein the first extension portion has a top end and a bottom end, the top end is closer to a light-emitting surface of the optical component than the bottom end, and a thickness of the first extension portion near the bottom end is larger than a thickness of the first extension portion near the top end.

7. The backlight module according to claim 6, wherein the first extension portion further has a third surface opposite to the first surface, and the third surface has a stepped configuration.

8. The backlight module according to claim 1, wherein the corner portion is lower than other portions of the first sidewall and the second sidewall in height to form a notch, and the flange portion is adapted to engage with the notch.

9. The backlight module according to claim 1, wherein a length of the first extension portion is longer than or equal to a length of the second extension portion.

10. The backlight module according to claim 9, when the length of the first extension portion is longer than the length of the second extension portion, an adhesive is disposed between the first surface and the inner surface of the first sidewall; when the length of the first extension portion is equal to the length of the second extension portion, an adhesive is disposed between the first surface and the inner surface of the first sidewall, or between the second surface and the inner surface of the second sidewall.

11. The backlight module according to claim 1, wherein the flange portion extends along the first direction by a length less than a length of the first extension portion.

12. A backlight module, comprising:
   an optical component;
   a frame having a first sidewall and a second sidewall, an end of the first sidewall connected to an end of the second sidewall to form a corner portion, the first sidewall and the second sidewall located at different sides of the optical component, the first sidewall and the second sidewall including a first angle therebetween; and
   an elastic member configured to be disposed on the frame, the elastic member including:
      a flange portion configured to be disposed on the corner portion;
      a first extension portion extending along a first direction away from the flange portion and having a first surface; and
      a second extension portion extending along a second direction away from the flange portion and having a second surface, a second angle included between the first extension portion and the second extension portion;
   wherein the flange portion is disposed on the corner portion along a direction perpendicular to the first direction and the second direction;
   wherein before the elastic member is disposed on the frame, the second angle is larger than the first angle; when the elastic member is disposed on the frame, the flange portion engages with the corner portion, the first surface is against an inner surface of the first sidewall, and the second surface is against an inner surface of the second sidewall.

* * * * *